United States Patent
Stanfield

[11] 3,968,348
[45] July 6, 1976

[54] CONTAINER HEATING JACKET

[76] Inventor: Phillip W. Stanfield, Rte. 1, Box 45, Osborne, Kans. 67473

[22] Filed: May 31, 1974

[21] Appl. No.: 474,940

[52] U.S. Cl. .............................. 219/535; 219/528; 219/538
[51] Int. Cl.² ........................................ H05B 3/58
[58] Field of Search .......... 219/301, 385, 345, 527, 219/528, 529, 535, 536, 549, 437, 438, 439, 524, 525, 433, 441

[56] References Cited
UNITED STATES PATENTS

| | | | |
|---|---|---|---|
| 1,477,602 | 12/1923 | Simon | 219/535 X |
| 1,674,488 | 6/1928 | Tang | 219/535 X |
| 1,992,593 | 2/1935 | Whitney | 219/535 |
| 2,426,976 | 9/1947 | Taulman | 219/525 |
| 2,464,052 | 3/1949 | Numrich | 219/535 X |
| 2,593,459 | 4/1952 | Johnson | 219/535 X |
| 2,710,909 | 6/1955 | Logan et al. | 219/528 X |
| 2,719,907 | 10/1955 | Combs | 219/528 |
| 2,889,439 | 6/1959 | Musgrave | 219/345 |
| 2,938,992 | 5/1960 | Crump | 219/528 |
| 3,173,419 | 3/1965 | Dubilier et al. | 219/528 X |
| 3,231,716 | 1/1966 | Van Den Bosch | 219/433 |
| 3,296,415 | 1/1967 | Eisler | 219/385 |
| 3,374,338 | 3/1968 | Morey | 219/529 |
| 3,573,430 | 4/1971 | Eisler | 219/385 |
| 3,597,591 | 8/1971 | Van Derlip | 219/528 |
| 3,657,517 | 4/1972 | Hoyt | 219/535 |

Primary Examiner—Volodymyr Y. Mayewsky
Attorney, Agent, or Firm—Haight, Hofeldt, Davis & Jambor

[57] ABSTRACT

This specification discloses an electrically heated container, container jacket and method of making same. The container and jacket each include at least three layers of fiber glass mat having resistance heating elements disposed between the first and second mats and a heat dissipating metallic sheet between second and third mats. The mats are separately impregnated with thermosetting polyester resin and cured together to form a rigid, fluid impervious laminated structure.

5 Claims, 6 Drawing Figures

U.S. Patent  July 6, 1976  3,968,348
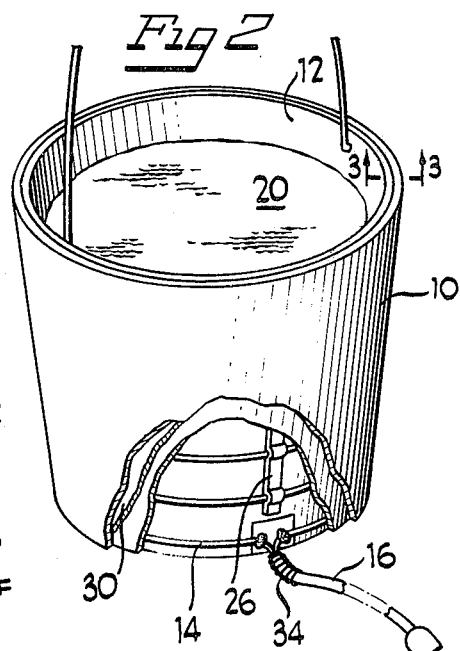
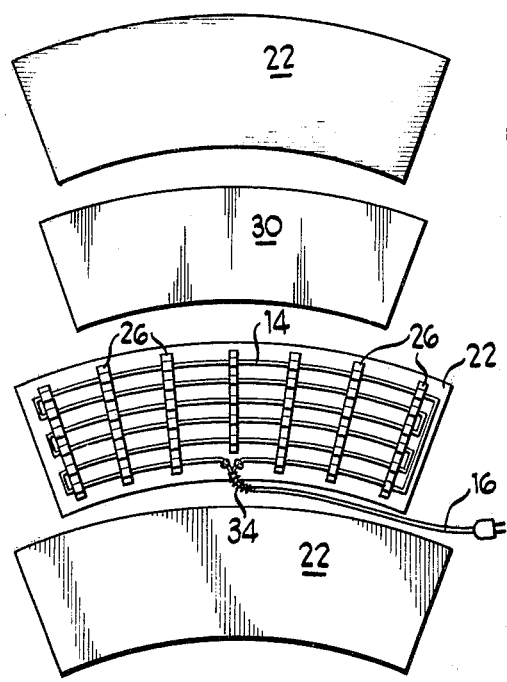
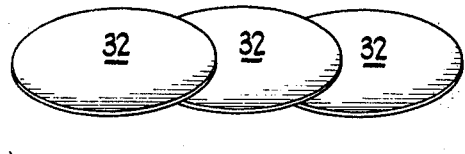
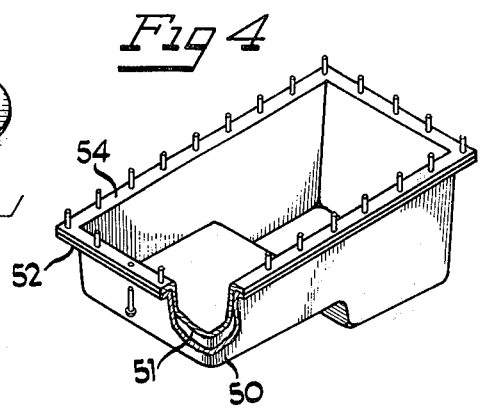
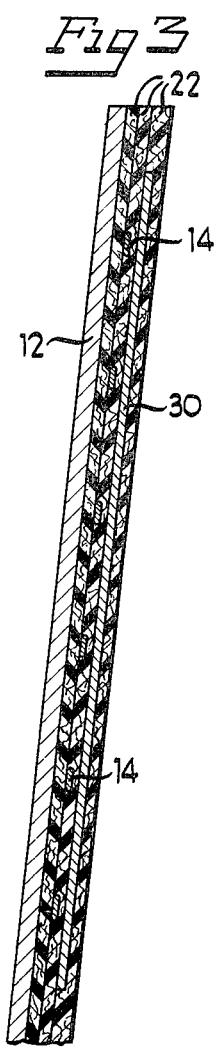
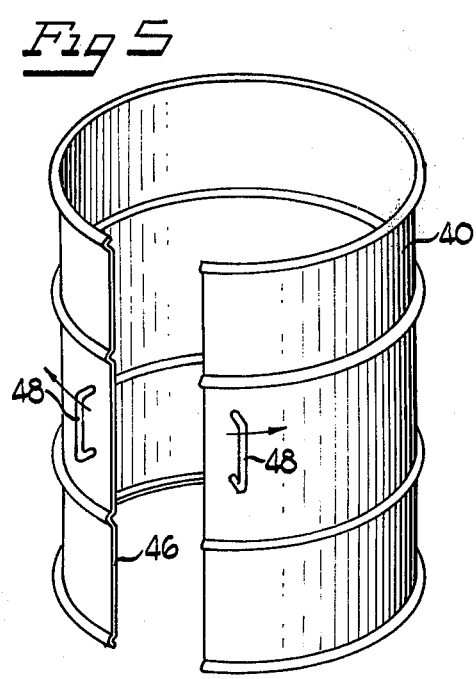
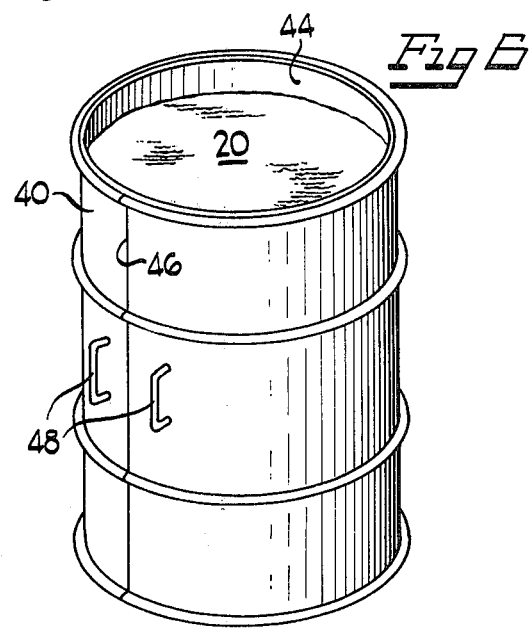

CONTAINER HEATING JACKET

BACKGROUND OF THE INVENTION

This invention relates to heated containers, container jackets and a method for making these units. The invention has various applications which may include the heating of metallic buckets used for watering livestock which freeze rapidly under winter conditions. Alternatively, the invention may be used to heat large containers or 55 gallon drums of industrial liquids to preclude their freezing or loss of viscosity when stored outdoors. Too, automatic equipment such as batteries do not operate efficiently when cold and the viscosity of oil in the oil pan inhibits engine starting. The instant invention may be utilized as a heating jacket for all of these devices or alternatively, may, in some cases, comprise the container itself.

SUMMARY OF THE INVENTION

The instant invention preferably includes three laminated layers of matted fiber glass impregnated with a thermosetting resin molded about a container to define a jacket. Between the first and second layers is placed a resistance heating element adapted for connection to a power source. Between the second and third layers is a metallic sheet which is used to uniformly distribute and dissipate the heat developed by the heating element. In some instances, the jacket may be transferred from container to container. In other cases, the jacket may be molded for permanent attachment and finally, it may constitute the container.

Accordingly, it is an object of my invention to provide a heating apparatus for containers and fluids therein. Another object is to provide a rigid, fluid impervious heating device having encapsulated resistance heating elements which may be directly utilized as a container. In another embodiment, the device serves as a jacket for receiving and transferring heat to a container. Finally, it is an object of my invention to provide an improved method for simply and efficiently making such devices.

DESCRIPTION OF THE DRAWINGS

The manner in which these and other objects of the invention are obtained will be made clear by a consideration of the following specifications and claims when taken in conjunction with the following drawings in which:

FIG. 1 is an exploded view of one embodiment of my invention depicting the components prior to assembly;

FIG. 2 is a perspective view of the embodiment of FIG. 1 in its assembled condition with portions broken away;

FIG. 3 is an enlarged side elevational view taken along the line 3—3 of FIG. 2;

FIG. 4 is a perspective view of another embodiment of my invention which forms a permanent heater container combination.

FIG. 5 is a perspective view of another embodiment of my invention in the form of a split jacket heater for an oil drum; and FIG. 6 is a perspective view of the embodiment of FIG. 6 in its operative condition.

DETAILED DESCRIPTION

As shown in FIGS. 1, 2 and 3, a preferred embodiment takes the form of a heater jacket 10 having walls adapted to receive and frictionally engage similar walls of a liquid container 12. This jacket is formed of a plurality of laminations encapsulating resistance heating elements 14 receiving electrical energy through a power cord 16. Heat generated in the jacket 10 is then transferred to the liquid 20 to preclude freezing. The structure and method of manufacturing this jacket insures electrical insulating of the heating element with excellent, uniform heat transfer through the container or bucket 12 into the liquid.

The method of manufacture can best be understood with reference to FIGS. 1 and 2. Initially, three separate fiber glass mats 22 are cut in such a manner that they will take a uniform frusto conical shape when applied to the outer surface of a mold which may be the container 12. These mats may comprise either chopped or continuous strand mats having a weight preferably of one to three ounces per square foot. Upon one side of the center mat 22 is placed a resistance heating element 14 such as nickel chromium wire, appropriately sized and having a resistance sufficient to develop the desired heat when connected to the intended source — usually 110 volts. As shown, the winding is laid in serpentine fashion, evenly distributed and fixed to the mat by a fiber glass tape 26. After the mats are cut and the resistance wire attached, each mat is serially immersed into a thermosetting resin catalyst solution and placed upon the mold. As shown in FIG. 3, the inner layer is first placed about the mold 12 for curing into a frusto conical shape similar to the container. Next, the middle layer or mat with the resistance wire 24 is immersed in the solution and placed adjacent the inner layer. Next, a layer of aluminum foil 30 is placed on the exterior surface of the middle layer to insure uniform heat distribution and transfer to the container 12. Finally, the outer mat 22 is immersed in the solution and applied against the foil 30 to provide the exterior skin of the jacket. Preferably, the foil is somewhat smaller than the mats such that the outer edges of the latter join and are bonded together upon curing of the resin.

The power cord 16 may be attached to the resistance heating unit before applying the inner mat to the container. If it is desired to connect the cord after curing, an opening should be molded into the jacket to permit access for such connection. After such connection, a cord protector 34 in the form of a coil spring may be telescoped over the cord and embedded into the cured mats. Finally, a silicone sealant may be applied to the aperture used for connection of the power cord, if subsequently attached.

Many thermosetting resin catalyst solutions may be utilized to provide the invention with the desired characteristics. A preferred resin is an isosalic polyester, Corezyn 393, which is a resin sold by Union Oil Company, Amsco Division. The preferred catalyst is Lupersol, DDM, sold by Lucidol Division of Pennwalt Company, Buffalo, N.Y. Upon curing of this polyester, the laminated jacket has very high strength, uniform heat transfer, and is impervious to liquids.

To convert the jacket into a container, circular mats (shown in FIG. 1) can be immersed and bonded to the bottom edges of the jacket 10 in the same manner in which the side walls are formed. Too, if desired, heating elements can be added to this bottom layer.

FIGS. 5 and 6 depict an alternative embodiment of my invention. Here, the jacket 40 is cylindrical and is adapted to fit over a 55 gallon drum 44. The side wall may comprise the same elements as the embodiment of FIGS. 1–3 and is formed about a drum 44 in a manner similar to that previously discussed.

After the unit has been assembled and cured, it is severed along a vertical line 46 between the resistance heating elements. During curing, two handles of fiber glass matting are formed into two U-shaped handles 48, immersed, and applied to the jacket 40. Upon curing, these handles are rigidly attached to the drum on opposite sides of the vertical cut 46.

With this embodiment, the vertical slit and the inherent flexibility of the jacket permits the user to increase its diameter by applying forces to the jacket handles in the direction of the arrows. By thus increasing the diameter, the jacket 40 can be slipped over the drum 44, with its memory returning the unit to its original position, closely encapsulating the drum.

This cylindrical jacket may be of particular benefit in heating solvents or other industrial liquids stored outside. Use of the jacket 40 to pre-warm these liquids prior to use would may be beneficial in raising the viscosity of the liquid or preparing it for use.

FIG. 4 depicts another embodiment of my invention. Here the heater jacket 50 is molded for permanent attachment to the oil pan 51 of a motor truck. Again, three separate fiber glass mats, and an electrical heater element are utilized and applied in the same manner as discussed with reference to FIGS. 1–3, the primary difference relating to shape. A flange 52 may be formed underneath the flanges 54 of the oil pan such that bolts may extend through the jacket and the pan into the engine housing. In this environment, the resistance wire wuld be normally sized to utilize a 12 volt source.

Accordingly, this invention provides a rigid, durable resistance heating jacket which can be formed or molded to fit any desired container, including batteries, buckets, drums and oil pans. After forming, the unit is trimmed or coated to provide a desirable appearance. Its sandwich structure results in a high strength, durable heater and can take forms other than these specifically mentioned here. Too, only two sheets of fiber glass mat can be used if desired, omitting the heat dissipator. Finally, the position of the heating element 14 and the dissipator may be reversed with the foil 30 being placed between the first and second layers and the element 14 being placed between the second and third layers of matted glass.

With respect to the embodiment of FIGS. 5 and 6, belts surrounding the jacket 40 may be used to press it into tight surface contact with barel 44. Alternatively, plastic straps may be bonded on opposite sides of cut 46 and be buckled or tied to each other to obtain such contact.

I claim:
1. A container heating jacket comprising:
   a. a cylindrical wall structure defined by at least two laminated fiber glass mats bonded together by a thermosetting plastic;
   b. a resistance heating element placed between said mats and adapted for connection to a power source for generating heat; and
   c. said wall structure being cut along a longitudinal axis to permit the jacket to be flexed and placed over a container having substantially the same dimensions as the jacket in its normal replaced condition, said wall structure having a memory for elastically holding itself to said container.
2. An apparatus as recited in claim 1 in which handle means are carried by said jacket for facilitating flexing thereof.
3. An apparatus as recited in claim 1 in which:
   a. said wall structure comprises three fiber glass mats bonded together by a thermosetting plastic;
   b. said heating element is placed between said first and second mats; and
   c. a metallic foil is placed between the second and third mats for uniformly distributing and dissipating the heat.
4. A container heating jacket comprising:
   a. a relatively rigid cylindrical wall structure formed of two layers of fiber glass bonded together by a thermosetting plastic;
   b. a resistance heating element encapsulated between said mats and adapted for connection to a power source for generating heat; and
   c. a cut along a longitudinal axis to permit the jacket to be flexed and placed over a container, the rigidity and memory of said fiber glass causing said wall structure to contract to its normal diameter and to elastically hold said structure about a container.
5. An apparatus as recited in claim 4 in which:
   a. said wall structure comprises three fiber glass mats bonded together by a thermosetting plastic;
   b. said heating element is placed between said first and second mats; and
   c. a metallic foil is placed between the second and third mats for uniformly distributing and dissipating the heat.

* * * * *